(12) United States Patent
Hundal

(10) Patent No.: US 8,285,311 B2
(45) Date of Patent: Oct. 9, 2012

(54) SYSTEM AND METHOD FOR COMMUNICATING OVER A DATA NETWORK OR THE PSTN USING A HYBRID CORDLESS TELEPHONE DEVICE

(75) Inventor: Sukhdeep Hundal, Surrey (CA)

(73) Assignee: VTech Telecommunications Limited, Hong Kong (HK)

( * ) Notice: Subject to any disclaimer, the term of this patent is extended or adjusted under 35 U.S.C. 154(b) by 708 days.

(21) Appl. No.: 11/648,634

(22) Filed: Jan. 3, 2007

(65) Prior Publication Data

US 2007/0167157 A1    Jul. 19, 2007

Related U.S. Application Data

(60) Provisional application No. 60/754,607, filed on Dec. 30, 2005.

(51) Int. Cl.
H04W 4/00    (2009.01)

(52) U.S. Cl. .............. 455/462; 455/74.1; 455/426.1; 455/465; 455/518; 379/88.17; 379/900; 370/348; 370/401; 370/466; 370/469

(58) Field of Classification Search .............. 370/469, 370/466, 348, 401; 455/518, 74.1, 426.1, 455/462, 465; 700/19; 379/88.17, 900
See application file for complete search history.

(56) References Cited

U.S. PATENT DOCUMENTS

| | | | |
|---|---|---|---|
| 6,404,764 B1 | 6/2002 | Jones et al. | |
| 7,190,972 B1 | 3/2007 | Hollister et al. | |
| 7,710,946 B2 | 5/2010 | Kusnitz et al. | |
| 7,830,863 B2 | 11/2010 | Biage et al. | |
| 2001/0055954 A1 | 12/2001 | Cheng | |
| 2002/0107047 A1* | 8/2002 | Sydon et al. | 455/561 |
| 2004/0141484 A1 | 7/2004 | Rogalski et al. | |
| 2004/0204084 A1 | 10/2004 | Tan et al. | |
| 2004/0218583 A1* | 11/2004 | Adan et al. | 370/352 |
| 2004/0259544 A1 | 12/2004 | Amos | |
| 2004/0266421 A1 | 12/2004 | Kato et al. | |
| 2005/0025182 A1* | 2/2005 | Nazari | 370/469 |

(Continued)

FOREIGN PATENT DOCUMENTS

DE    199 45 663    4/2001

(Continued)

OTHER PUBLICATIONS

German Office Action with English Translation; dated Sep. 1, 2008.

(Continued)

*Primary Examiner* — Charles Appiah
*Assistant Examiner* — Jaime Holliday
(74) *Attorney, Agent, or Firm* — McAndrews, Held & Malloy, Ltd.

(57) ABSTRACT

A hybrid cordless telephone system allows a user to place or receive a call over either a data network or a PSTN network. In one aspect, a system router and PSTN unit are coupled with a communications manager to avoid extensive redesign of router components and PSTN components while providing a wireless user with data network and PSTN connectivity. In another aspect, the system router of the hybrid cordless telephone system includes a communications manager configured to provide termination of data network calls or PSTN calls at the system router. Accordingly, a plurality of handsets can each access the system router to place or receive calls from the data or PSTN networks.

35 Claims, 13 Drawing Sheets

U.S. PATENT DOCUMENTS

| | | | |
|---|---|---|---|
| 2005/0068938 A1* | 3/2005 | Wang et al. | 370/352 |
| 2005/0074031 A1 | 4/2005 | Sunstrum | |
| 2005/0125083 A1* | 6/2005 | Kiko | 700/19 |
| 2005/0271029 A1* | 12/2005 | Iffland | 370/348 |
| 2006/0068774 A1 | 3/2006 | Kerr | |
| 2006/0227760 A1 | 10/2006 | Elbæk et al. | |
| 2007/0021138 A1* | 1/2007 | Allen et al. | 455/518 |
| 2007/0054686 A1* | 3/2007 | Allen et al. | 455/518 |

FOREIGN PATENT DOCUMENTS

| | | |
|---|---|---|
| EP | 1 107 549 | 6/2001 |
| WO | WO 2005/064964 | 7/2005 |

OTHER PUBLICATIONS

U.S. Office Action dated Apr. 2, 2010, U.S. Appl. No. 11/645,573.
U.S. Office Action dated Jul. 21, 2010; U.S. Appl. No. 11/645,573.
U.S. Office Action dated Oct. 5, 2010; U.S. Appl. No. 11/645,573.
U.S. Office Action dated Apr. 1, 2011; U.S. Appl. No. 11/645,573.

\* cited by examiner

SYSTEM AND METHOD FOR COMMUNICATING OVER A DATA NETWORK OR THE PSTN USING A HYBRID CORDLESS TELEPHONE DEVICE

The present invention claims the benefit of U.S. Provisional Application 60/754,607, filed, Dec. 30, 2005, which is hereby incorporated by reference herein in its entirety.

BACKGROUND

1. Field of the Invention

The present invention relates generally to wireless communications systems. More particularly, the present invention relates a hybrid cordless telephone system that allows a user to engage in telephonic communication using a data network, such as the Internet, or the publicly switched telephone network (PSTN).

2. Background

As alternatives to the publicly switched telephone network (PSTN), such as cellular telephony and Voice over Internet Protocol (VoIP), become more widely available and accepted, hybrid telephone devices that provides users the ability to communicate using more than one telephone technology become increasingly useful.

In the case of VoIP, also referred to as Internet telephony, for example, users are able to conduct a telephone conversation over a data network, such as the Internet. Using a digital device, such as a computer or Internet telephone, a user's voice is digitized into packets that are transmitted to the called party's telephone over the data network. FIG. 1 is a schematic diagram of a conventional system for carrying out VoIP communications over a data network. A VoIP telephone provides a user access to VoIP communications. VoIP telephone 102 is provided with an analog telephone adapter (ATA) 103 to send and receive digital data carried over the Internet. The caller's voice is received in a microphone of VoIP telephone 102 and digitized for transmission as data packets over a data network 104, such as the Internet. The digitized voice data is received by the called party, who may either employ a traditional telephony device 106, a VoIP telephone 107, or use a device supporting VoIP, such as computer 108.

Using VoIP provides potential advantages for users. For example, because VoIP telephone calls can be made over the Internet, long distance charges can be avoided. Further, because data is carried in packets, service providers may realize savings in bandwidth and other resource usage as compared with circuit-switched communications paradigms such as the PSTN.

VoIP technology can also be used to provide communication between a cordless telephone user and a VoIP network. FIG. 2 illustrates a conventional cordless VoIP telephone system 200. Cordless VoIP telephone system 200 includes a base unit 202 and a handset 204. Base unit 202 includes system microcontroller/router 206. System microcontroller/router 206 sends and receives a VoIP data stream to and from a data network 208 using an analog terminal adapter module 210. ATA 210 provides connectivity to data network 208 through a connector 209, such as RJ45 connector and a modem or other data network connection, such as device 211. A wireless module 212 sends and receives digital data wirelessly to handset 204 through a base antenna 214. Handset 204 is configured with an adapter that can convert a VoIP digital data stream into an analog signal to be played through an earpiece in handset 204 to the user. Handset 204 communicates with base unit 202 using an RF communications protocol (or standard) such as 802.11 or DECT. In this manner, a user of handset 204 can communicate wirelessly to an external telephone number using VoIP technology.

Despite the advantages of these alternative telephone technologies, for many telephone users, it may be desirable to maintain a traditional PSTN line in addition to an alternative telephone technology. For example, the user's Internet connection may not be operating or may not be operating properly making telephonic communication difficult or impossible. As a result, the user may desire to have access to the often more reliable PSTN. In such cases, a hybrid telephone that allows a user the ability to connect to both the PSTN or a data network, such as the Internet, would be desirable.

However, there are a number of challenges associated with a hybrid cordless telephone that allows conventional cordless telephones to engage in telephone communications over a data network or the PSTN. For example, many cordless telephone systems were designed to transmit primarily voice information employing time division multiplexing (TDMA) technologies such as WDCT. Unfortunately, such technologies are not designed to carry high speed data connections that are desirable to support VoIP communications. Similarly, handsets using digital protocols, such as 802.11, are not designed to communicate with an analog link to the PSTN. Consequently, what is required is a hybrid cordless telephone system that allows a user to communicate over a data network or over the PSTN.

SUMMARY OF THE INVENTION

In one embodiment of the present invention, a hybrid cordless telephone system for managing communications with a plurality of communications networks includes a wireless handset configured to communicate over a wireless link. The wireless handset is linked to a system router through a radio link, such as an 802.11 wireless link. The system router routes communications to and from the wireless handset, to and from a data network, and to and from the PSTN network. The wireless handset is configured to receive or send telephone calls or information to a data network using a data communications protocol such as VoIP or a wireless over internet protocol, or over the PSTN.

A base unit controller is coupled to the system router. In one embodiment of the present invention, for example, the system router is coupled to the base unit controller through a data line and a separate digital audio line. The base unit controller is further linked to a PSTN network. The base unit controller receives and sends messages over a traditional telephone line. In one embodiment, the base unit controller includes a WDCT ASIC configured with WDCT processing functions to communicate with the wireless handset. The base unit controller further includes DTMF detection and generation apparatus and audio codecs to communicate over the PSTN. To avoid reconfiguration of conventional cordless telephone system routers to the extent possible, as well as its associated expense and complexity, a system router according to an embodiment of the cordless hybrid telephone system of the present invention may be configured to operate without containing audio processing functions.

In another embodiment of the present invention, a hybrid cordless telephone system for managing communications with a plurality of communications networks includes a plurality of wireless handsets. Each of the handsets is configured to communicate over a wireless link using a data network protocol, such as VoIP. The wireless handsets are linked to a system router in a base unit of the hybrid cordless telephone system through a radio link, such as an 802.11 wireless link.

The wireless handsets are further configured to receive or send telephone calls with a PSTN.

The system router includes a system microcontroller that communicates with the radio link to the wireless handsets, and to the data network. In one aspect, the system router includes a communications manager that is configured to provide termination of data network calls or PSTN calls. Accordingly, the plurality of handsets can each access the system router to place or receive calls from either a data network, such as the internet, or a PSTN.

Another embodiment of the present invention is a method of placing a telephone call from a wireless handset of a hybrid cordless telephone system over a data network or the PSTN. The method includes a first step of receiving a signal from the wireless handset that designates a telephone network to carry the telephone call. If the PSTN is designated, the telephone phone call is terminated at a proxy within the hybrid cordless telephone system. Voice data packets sent from the wireless handset are terminated at the proxy. Digital voice data packets are sent from the proxy to a PSTN module in the hybrid cordless telephone system. The PSTN module converts the digital voice data packets into analog signals for transmission over the PSTN to a called party. If a data network, such as the Internet, is designated, the hybrid telephone device waits to receive control signals and voice data packets from the wireless handset. The control data and voice packets are then forwarded over the data network and terminated at the called party.

Another embodiment of the present invention is a method for managing calls to a user of 802.11 communications devices that are local to an access point. The method includes a step of receiving call information over an external network, such as the Internet, at a base unit containing the access point. The base unit is in communication with a PSTN and the data network. The call information is terminated at a proxy within the base unit. The call information is forwarded as data packets to the 802.11 communications devices over a wireless communications link. Each of the 802.11 communications devices is configured to receive the data packets so that an incoming call can be handled at any device that is associated with the access point.

In another embodiment of the present invention, an 802.11 multihandset system comprises a wireless base unit that is coupled to an external IP network, such as the Internet, and is configured to terminate incoming calls at a SIP proxy. Handsets that are associated with the base unit are not individually addressable. However, a handset or multiple handsets can access the terminated call(s) because the base station audio mixes the individual streams (from multiple handsets) with the incoming VoIP calls. In one embodiment, each of a plurality of handsets can initiate a call over an external IP network, such as the Internet, at the same time, in accordance with the amount of simultaneous calls permitted by a service offering of a VOIP provider.

In another embodiment of the present invention, a base unit/wireless router of a wireless 802.11 system performs audio mixing functions that permit parties operating a plurality of wireless handsets to be simultaneously heard by each other and by a remote party coupled through an IP provider to the base unit/wireless router.

In a further embodiment of the present invention, an audio packet management system includes a base unit/wireless router that contains an audio routing management mixer that is configured to properly mix audio samples received remotely over an IP network with audio samples received from a wireless handset coupled to the wireless router. In another embodiment of the present invention, a VoIP and PSTN call can be combined as a conference call.

DETAILED DESCRIPTION OF THE INVENTION

Figure 1:
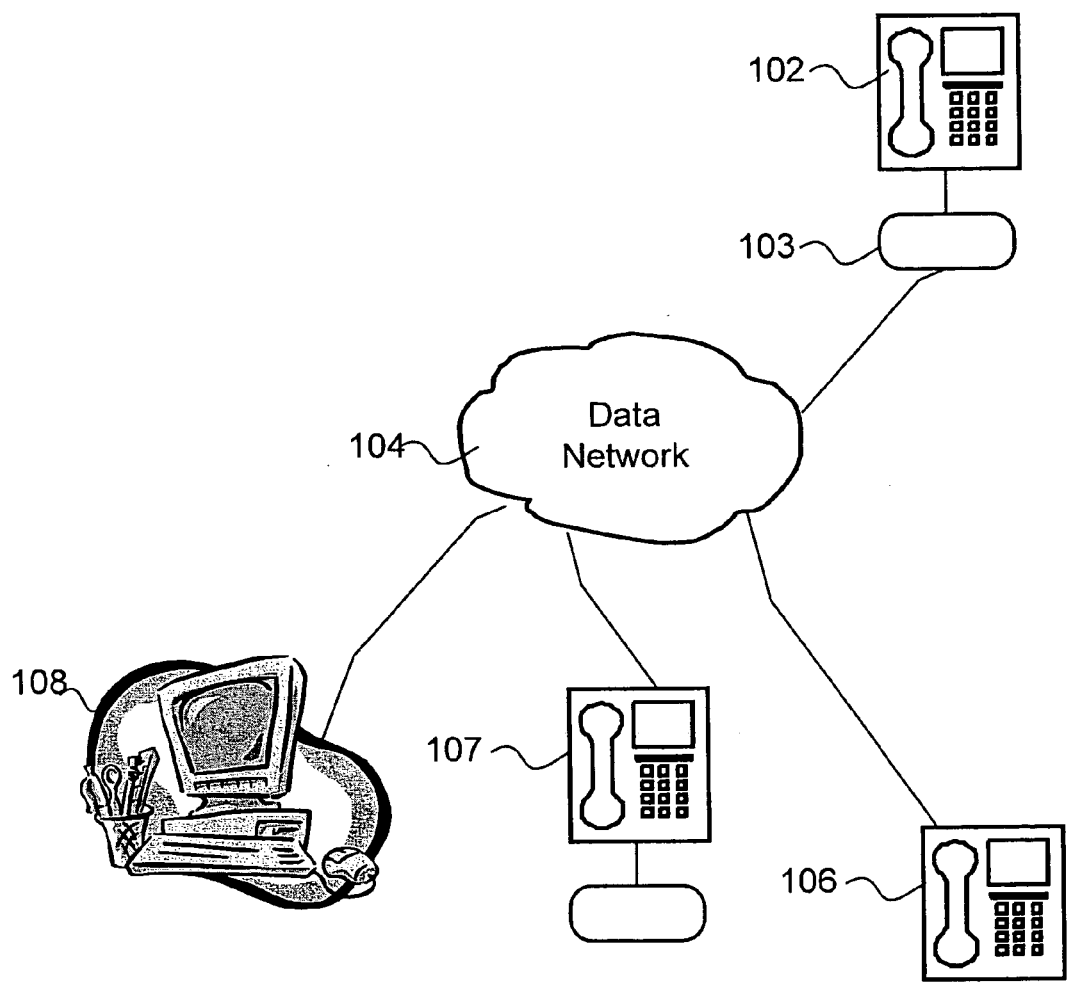
FIG. 1 is a schematic diagram illustrating a conventional architecture for a VoIP telephone communicating with external telephones.
Figure 2:
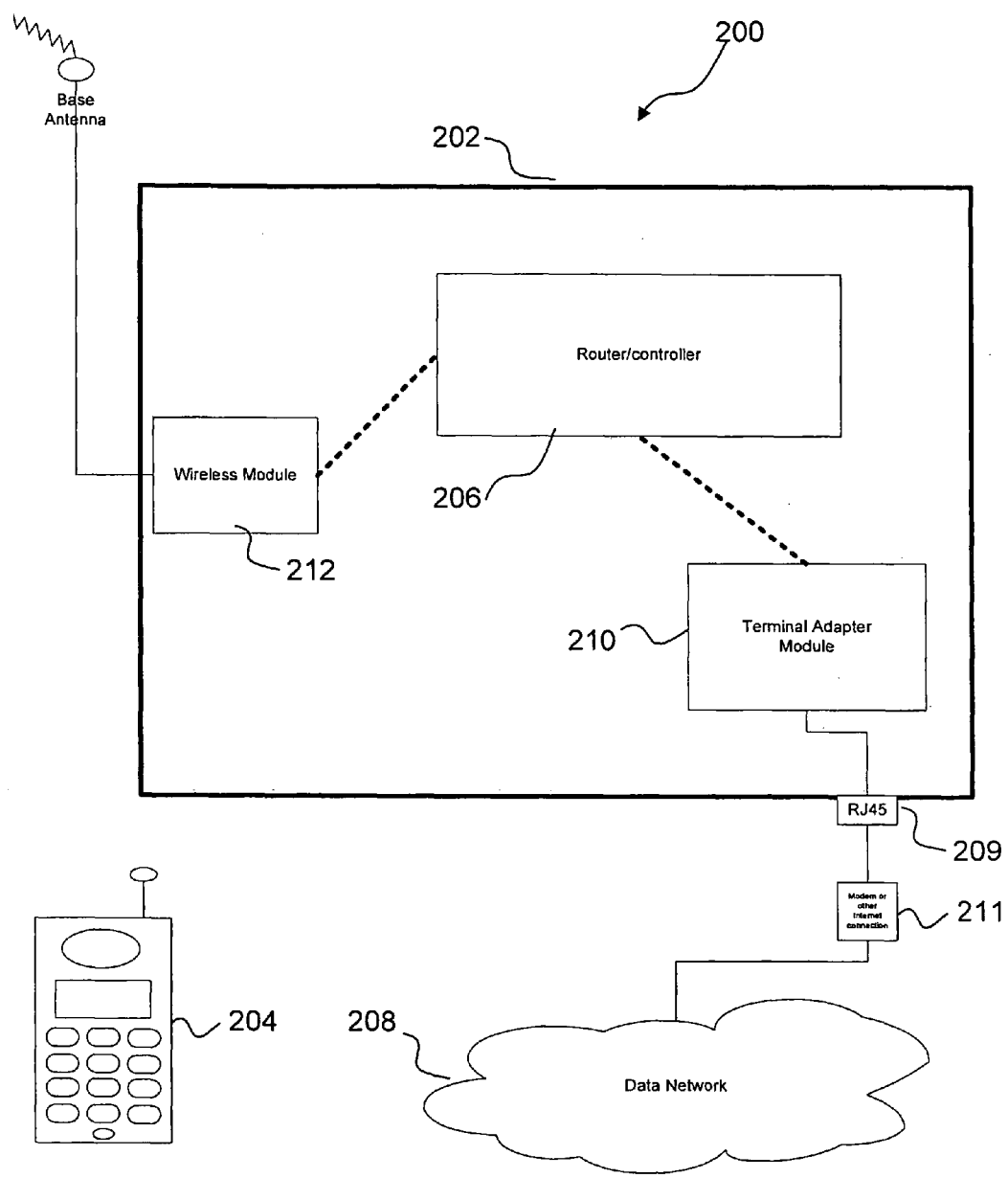
FIG. 2 is a schematic diagram of a conventional cordless telephone for carrying out VoIP communications.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being-practiced or being carried out in various ways. Also, it is to be understood that the phraseology and terminology used herein is for the purpose of description and should not be regarded as limiting.

Figure 3:
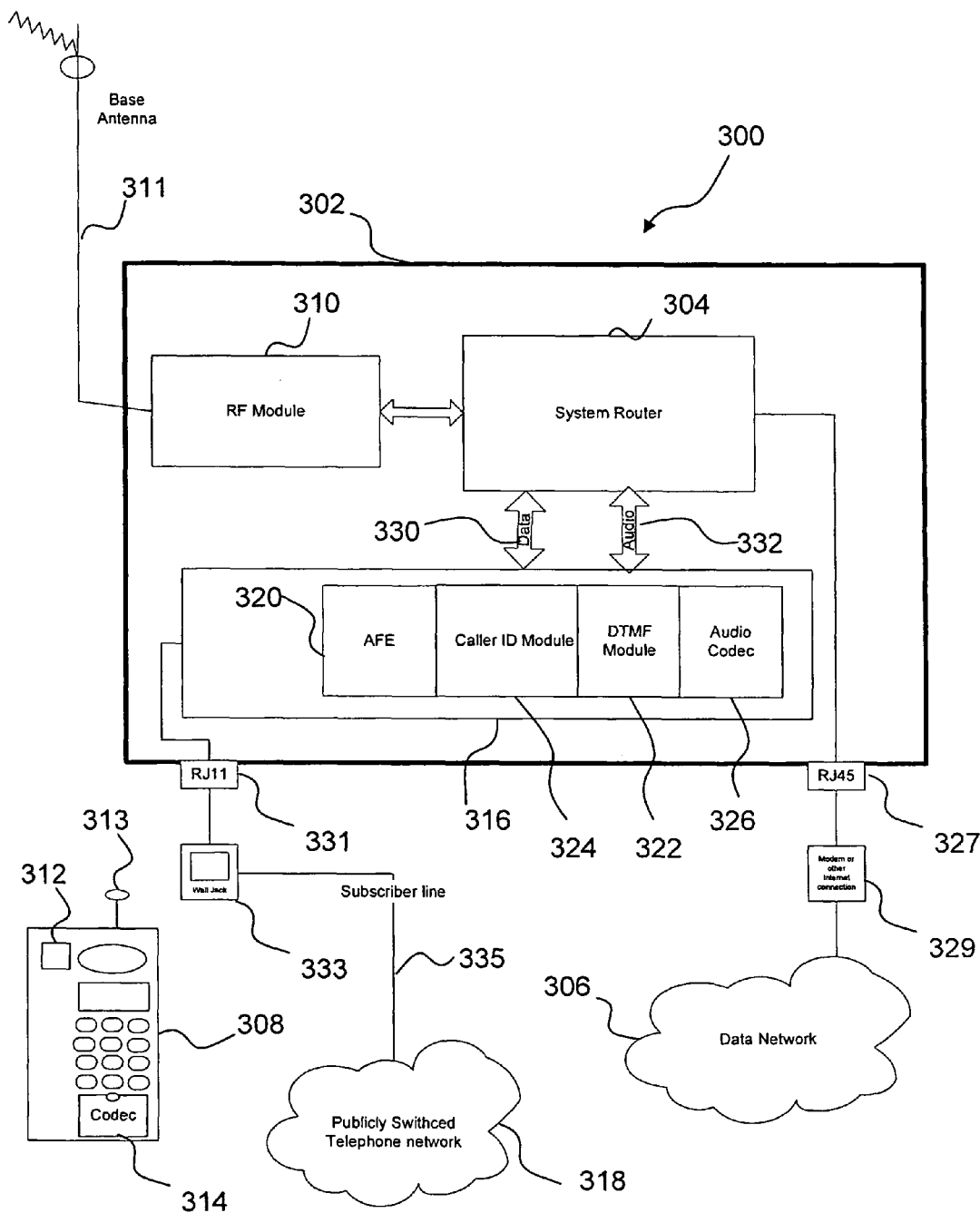
FIG. 3 is a schematic diagram of a hybrid cordless telephone system according to an embodiment of the present invention.

FIG. 3 is a schematic diagram of a hybrid cordless telephone system 300 according to one embodiment of the present invention. A base unit 302 includes a system router 304 that is coupled to a data network 306 through a connector 327 and a modem 329. Data network 306 can be any data network including, for example, the Internet, a local area network (LAN), a wide area network (WAN), or other data network. System router 304 provides support for wireless communications, such as the 802.11 standard, firewall functions, and LAN and/or WAN support. System router 304 can be implemented on a single processor chip or on a plurality of processor chips that together perform the above functions. Base unit 302 is coupled to a wireless handset 308 through a base antenna 311 via an RF module 310.

When a caller places a telephone call using wireless handset 308, wireless handset 308 transmits a series of data packets to base unit 302 through an antenna 313. The data packets received by base unit 302 through base antenna 311 and RF module 310 are routed by system router 304. System router 304 uses information provided by the user to route the data packets to a data network 306 or to the PSTN 318.

To carry out wireless communication, in one embodiment of the present invention, RF module 310 uses the 802.11 communications protocol. Other wireless communication protocols, such as Bluetooth, could be used by RF module 310 for carrying out wireless communications.

In addition to transmitting data packets over data network 306, in one embodiment of the present invention, system router 304 receives and transmits VoIP telephone calls to and from wireless handset 308. As such, preferably wireless handset 308 includes VoIP engine functionality. Such VoIP engine functionality includes analog interface 312 and voice codec 314. When handset 308 receives a VoIP data packet routed to it by system router 304 through RF module 310, the VoIP data packet is converted into an audio signal. For example, in the embodiment of the present invention illustrated in FIG. 3, voice codec 314 converts the VoIP data packet to an analog signal that can be played to a user through analog interface 312. Accordingly, system router 304 need not include the VoIP functionality contained in handset 308, which avoids having to redesign conventional system routers, and the expense associated with such redesign.

Base unit 302 also includes a base unit processor 316. Base unit processor 316 is used to receive and transmit signals from and to the PSTN 318. Communication with the PSTN 318 is carried out through a connector 331 and a wall jack 333. In the embodiment of the present invention illustrated in FIG. 3, base unit processor 302 contains processing functions found in a WDCT ASIC chip, including an analog front end (AFE) module 320, a DTMF module 322, a caller ID module 324, and an audio codec 326. AFE module 320 digitizes an analog signal received from PSTN 318 in a well known manner. AFE module 320 also receives digital data transmitted from system router 304 over data line 330 and audio line 332, and converts the received digital data into an analog output, AFE module 320 can also perform other well known analog front end management functions for operation in TDMA cordless telephone systems. AFE module 320 can also process PSTN data such as CID FSK detection and call progress tone detection.

When a caller using handset 308 places a call to a called party over PSTN 318, the caller's voice is digitized in handset 308 by analog interface 312 and audio codec 314. The digitized voice data is transmitted wirelessly to RF module 310 through base antenna 311. The digitized voice packets are forwarded to system router 304 which routes the data to base unit processor 316. Base unit processor 316 converts the digitized packet data to an analog signal using audio codec 326 and converting in AFE 320. Base unit processor 316 then outputs the analog signal over a subscriber line 335 to PSTN 318. In addition to the digitized voice data, handset 308 transmits a signal containing the dialed telephone number to system router 304. System router routes the signal containing the dialed telephone number to a DTMF module 322 in base unit processor 316. Using this signal, DTMF module 322 generates DTMF signaling tones in accordance with the dialed telephone number contained in the signal.

In the embodiment of the present invention illustrated in FIG. 3, base unit processor 316 includes a caller ID module 324 to provide a user of handset 308 with calling party information. For example, in an embodiment of the present invention, when a call is received by base unit 302 from PSTN 318, caller ID information is demodulated by caller ID module 326 and forwarded to system router 304. In one embodiment of the present invention, the caller ID information is transmitted to system router 304 as a data message containing caller information that can be sent over data link 330. System router 304 then forwards the data message to handset 308 wirelessly through RF module 310.

Figure 4A:
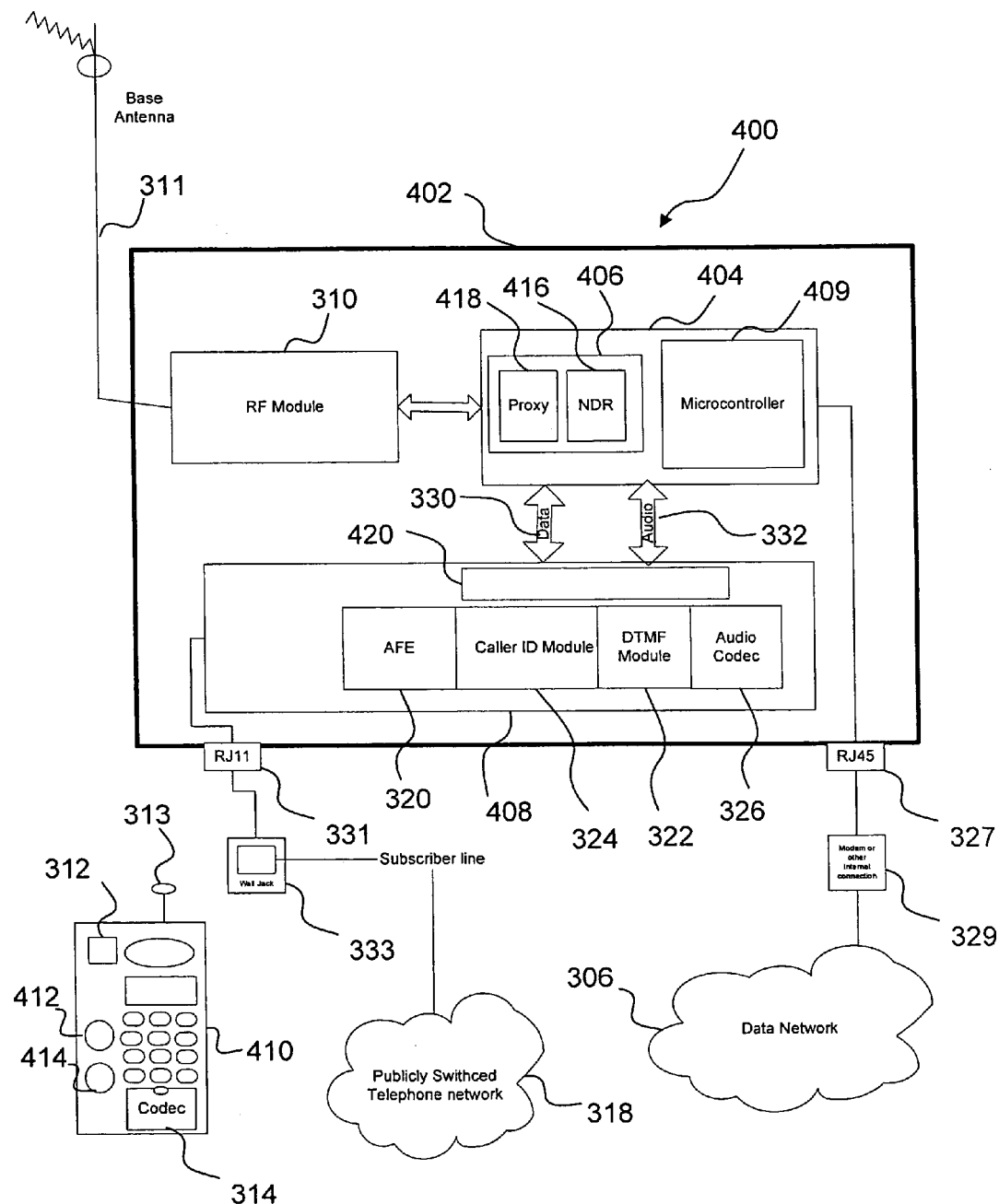
FIG. 4a is a schematic diagram of a hybrid cordless telephone according to another embodiment of the present invention.

FIG. 4*a* illustrates a hybrid cordless telephone system 400 in accordance with another embodiment of the present invention. A base unit 402 includes a system router 404 and a base unit processor 408. System router 404 includes a communication manager 406 that provides communication management functions for data sent from wireless handset 410 that is destined for either data network 306 or PSTN 318. Communication manager 406 includes a network detection routine (NDR) 416 and a proxy 418. Network detection routine 416 determines whether to use data network 306 or PSTN 318. Network detection routine can makes this determination automatically by, for example, random or scheduled assignment, or at the request of the user (described below). Proxy 418 provides termination for telephone calls in system router 404 for telephone calls placed by a wireless handset destined for the PSTN. In this manner, data for telephone call between a wireless handset and the PSTN can be reconfigured as required. Communication manager 406 can be embodied in a combination of hardware and software.

System router 404 also includes a system microcontroller 409. System microcontroller 409 manages routing functions, such as firewall functions, and access point functions related to communication with wireless handset 410, such as wireless handset registration upon the handset's powering on.

Wireless handset 410 preferably contains VoIP functionality, including codec 314 and analog interface 312. In this manner, VoIP-compatible data packets can be output and transmitted to base unit 402 for direct transmission over data network 306.

As described above, network detection routing 416 can determine whether to route data over a data network 306 or the PSTN 318. In one embodiment of the present invention, this determination is provided by a cordless telephone user selecting which network to use via handset 410. In the embodiment illustrated in FIG. 4*a*, for example, wireless handset 410 contains VoIP button 412 and PSTN button 414. A user can depress either button according to instruct system router 404 which network to use. For example, in embodiments in which wireless handset 410 is an 802.11 handset communicating using the 802.11 protocol, after wireless handset 410 is registered with system router 404, a user presses one of buttons 412 or 414. Pressing one of buttons 412 and 414 causes handset 410 to transmit a control signal to base unit 402. The control signal carries an identification of whether to use the data network (button 412 pressed) or the PSTN (button 414 pressed). Network detection routine 416 determines the type of call to be placed in accordance with the control signal. When a user of handset 410 subsequently dials a number, the ensuing call is routed to the appropriate network.

Referring to the exemplary system illustrated in FIG. 4*a*, a wireless device, such as wireless handset 410 can also be turned "on" by pressing either VoIP button 412 or PSTN button 414. An alerting signal is then sent over an RF link to system router 404 to alert base unit 402 that handset 410 is operational. The alerting signal can also identify the network the user desires to use to place the telephone call.

In an embodiment of the present invention using an 802.11 protocol, the user's selection of which network to use for an outgoing call from handset 410 can be transmitted in an extension to an 802.11 message from wireless handset 410 to system router 404. When system router 404 receives the message from wireless handset 410, network detection routine 416 determines the network to use from the extension to the 802.11 message, and system router 404 routes the call to the appropriate network.

Figure 4B:
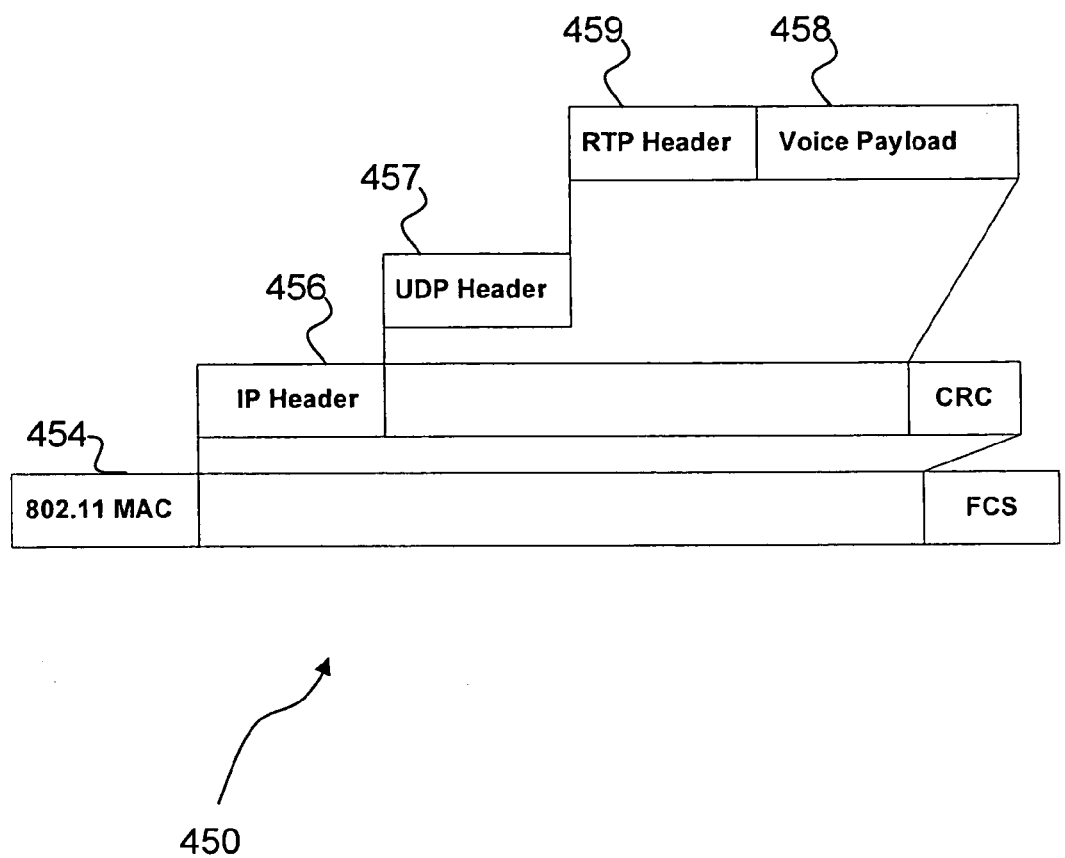
FIG. 4b is an exemplary frame structure for data communications between an 802.11-compliant devices.

FIG. 4b is an exemplary frame structure 450 for transmitting data between devices operating according to an 802.11 protocol according to an embodiment of the present invention. Frame structure 450 includes an 802.11/MAC header 454 and an IP header 456. 802.11/MAC header 454 and IP header 456 are transmitted, for instance, when an 802.11-compliant wireless handset sends a message to a wireless access point for transmission over a data network. Frame structure 450 also includes a cyclic redundancy code and frame sequence check for error detection and correction.

System router 404 can remove 802.11/MAC header 454 before sending UDP header 457, RTP header 459, and voice payload 458 over data network 306. If the IP address of system router 404 differs from the IP address of wireless handset 410 as provided in the message sent from the wireless handset, system router 404 replaces IP header 456 with a new IP header corresponding to system router 404's IP address before transmitting voice payload 458 over network 306. Accordingly, save for stripping of some header information, system router 404 acts essentially as an intermediate point for an outgoing message originating at wireless handset 410 that is destined for data network 306.

Likewise, when a call to a user of wireless handset 410 is placed over data network 306, wireless handset 410 appears as an individually addressable device with its own data network address (IP address). In this case, system router 404 acts essentially as a conduit for the incoming call that is terminated at wireless handset 410. If the wireless handset is an 802.11 handset, system router 404 adds an 802.11/MAC address header to the frame, and sends it along with a voice data packet to the wireless handset.

If, on the other hand, network detection routine 416 determines that a call is to be routed to PSTN 318, the format of the call data received from wireless handset 410 may need to be altered before system router 404 forwards the data to base unit processor 408. To provide such data alterations, communication manager 406 includes a proxy module 418. Proxy module 418 reconfigures call information received from wireless handset 410, and provides signals to base unit processor 408 when a call designated for PSTN 318 is placed by handset 410. When a called party telephone number is entered into handset 410, system router 404 receives data packets containing the telephone number. After it is determined that the call is to be routed to PSTN 318, communication manager 406 terminates the call at proxy module 418, sends an "off-hook" signal to PSTN 318, and passes along a DTMF string to base unit processor 408 to signal the called party over PSTN 318.

If wireless handset 410 is configured to transmit calls as internet protocol (IP) data packets, the IP data packets are terminated at proxy module 418. In such a case, proxy module 418 preferably is configured as a session initiation protocol (SIP) proxy. System router 404 then transmits appropriate voice data and control data signals over audio data link 332 and data link 330, respectively. Establishing an SIP proxy allows system router 404 to receive IP voice data packets as if they are destined for a VoIP terminating point. Consequently, from the point of view of wireless handset 410, a standard VoIP call is placed. When a voice data packet transmitted from wireless handset 410 is received at SIP proxy 418, it is forwarded to base unit processor 408 for transmission as an analog PSTN signal. Use of the SIP proxy allows a hybrid cordless telephone according to an embodiment of the present invention to avoid extensive changes to VoIP-based hardware or software in handset 410 are not required to transmit data packets.

In one embodiment of the present invention, base unit processor 408 is a WDCT base unit ASIC containing standard PSTN/WDCT modules. Such a WDCT base unit ASIC was discussed above with respect to FIG. 3. Alternatively, base unit processor 408 can be an ASIC configured according to any cordless technology type that can perform the processing and signaling for the PSTN and other wireless protocol type functions. Such a cordless technology type is DECT.

Conventional WDCT ASIC type processing units are configured to send data signals directly to a wireless handset over an RF link. In the arrangement illustrated in FIG. 4a, however, data is sent to system router 404 instead. Thus, the communications protocol must be modified from a conventional WDCT ASIC. To provide the required modification, base unit processor 408 also includes a router communications interface 420. Router communications interface 420 provides the required modification by communicating data packets from system router 404 to base unit processor 408. For example, where base unit processor 408 operates in accordance with the WDCT processing, communications interface 420 outputs control data (telephone number, frame structure, off hook signals, etc.) from base unit processor 408 to data line 330 using conventional WDCT base station ASIC techniques. In the case of voice data packets, however, communications interface 420 outputs voice data to system router 404 after converting the data to digital form, but before the data is placed in a WDCT frame structure. Thus, when an analog voice signal is received from PSTN 318, the signal is converted into a digital packet and processed through an audio codec. However, using communications interface 420, the signal is then sent directly to system router 404 in voice data packets without a WDCT frame structure being applied to the transmission of the voice data packets.

Figure 4C:
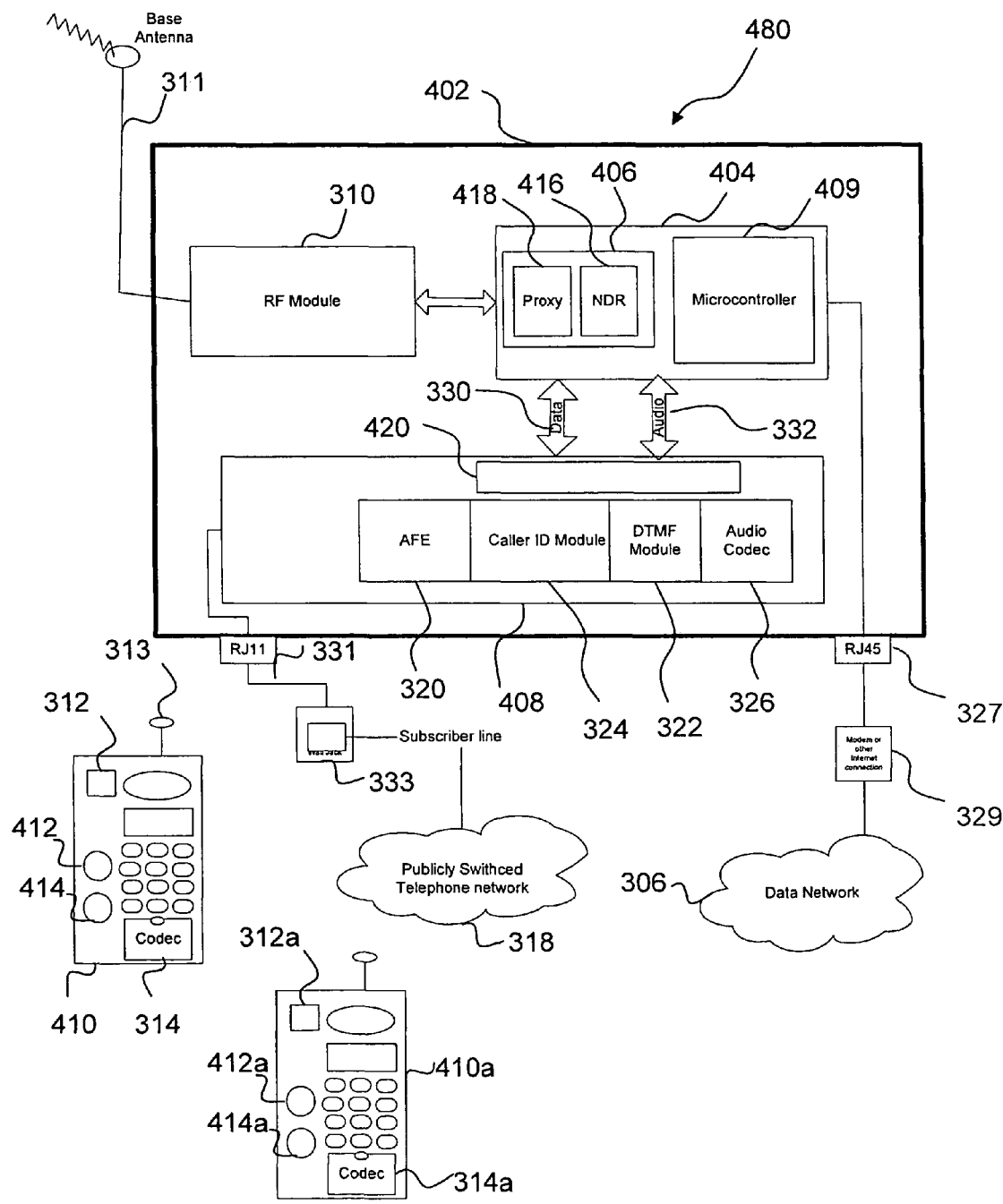
FIG. 4c is a schematic diagram of a hybrid cordless telephone system according to another embodiment of the present invention.

FIG. 4c is a schematic diagram of another embodiment of a hybrid cordless telephone system allowing access to both a data network and the PSTN according to an embodiment of the present invention. A wireless communication system 480 includes a base unit 402 and one or more wireless handsets 410 and 410a. In the embodiment of the present invention shown in FIG. 4c, wireless handsets 410 and 410a can place calls independently through base unit 402. For example, a user of wireless handset 410 can route a telephone call through data network 306 by pressing VoIP button 412 prior to dialing a telephone number, while a user of handset 410a can place a call through the PSTN network 318 by pressing PSTN button 414a prior to dialing a telephone number. Because the VoIP line and PSTN line are associated with different telephone numbers and different services, the calls can take place independently and simultaneously.

Figure 5:
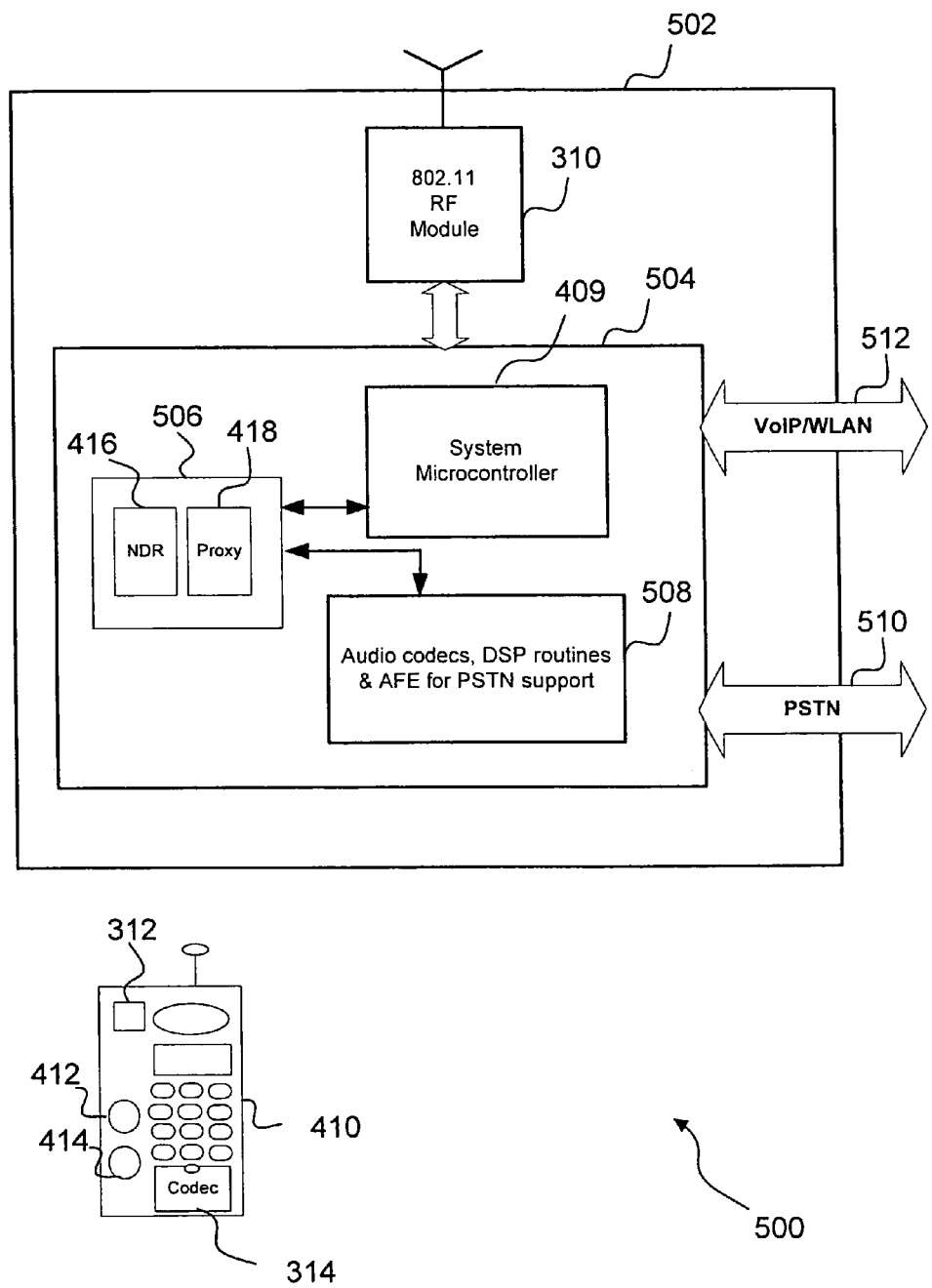
FIG. 5 is a schematic diagram of a hybrid cordless telephone system according to another embodiment of the present invention.

FIG. 5 is a schematic diagram of a hybrid cordless telephone system 500 for allowing a user to place a telephone call over a data network or the PSTN according to another embodiment of the present invention. A base unit 502 includes a system router 504 and an RF unit 310. System router 504 includes a system microcontroller 409 and a communications manager 506. Communications manager 506 is configured to operate similarly to communications manager 406 described above with respect to FIG. 4*a*. System router 504 also contains a PSTN module 508. PSTN module 508 preferably includes audio codecs, DSP routines and AFE to support PSTN functions as described above with respect to PSTN module 408 of FIG. 4*a*.

As shown in FIG. 5, system router 504 is directly coupled to a PSTN line 510, as well as to a data line 512. As described above, a user of handset 410 can select to send a VoIP telephone call or PSTN telephone call. For example, as described above, the user can make this selection by pressing either VoIP button 412 or PSTN button 414, and using of an extension to an 802.11 message sent between system router 504 and 802.11 handset 410. When base unit 502 receives a message indicating which network the user desires to carry the telephone call, system router 504 performs any required operations on the data received from wireless handset 410 to enable communication over the desired network, and directs the call to either VoIP line 512 or to PSTN line 510 as appropriate.

If a user of wireless handset 410 selects to place a call over data (VoIP/WLAN) line 512, in one implementation in which handset 410 uses an 802.11 protocol, the call proceeds as described above with respect to FIGS. 4 and 4*a*. If, on the other hand, a user of handset 410 desires to a place call over PSTN 510, communications manager 506 terminates the incoming message from handset 410 at system router 504. Communication manager 506 sends an "off hook" message to PSTN module 508 over a data link. In addition, PSTN module 508 performs the functions of a standard cordless TDMA base station for transmitting the call over PSTN line 510. In other words, if handset 410 is configured to transmit calls as internet protocol (IP) data packets, the IP packets are terminated at communications manager 506. Communications manager 506 and PSTN module 508 reconfigure for transmission over line 510 using PSTN module 508 and communications manager 506. For example, the telephone number control data received from wireless handset 410 is forwarded by communications manager 506 to PSTN module 508. PSTN module 508 converts the telephone number control data to DTMF tones corresponding to a telephone number dialed. System router 504 initiates the telephone call by sending the DTMF tones to PSTN line 510.

Figure 6:
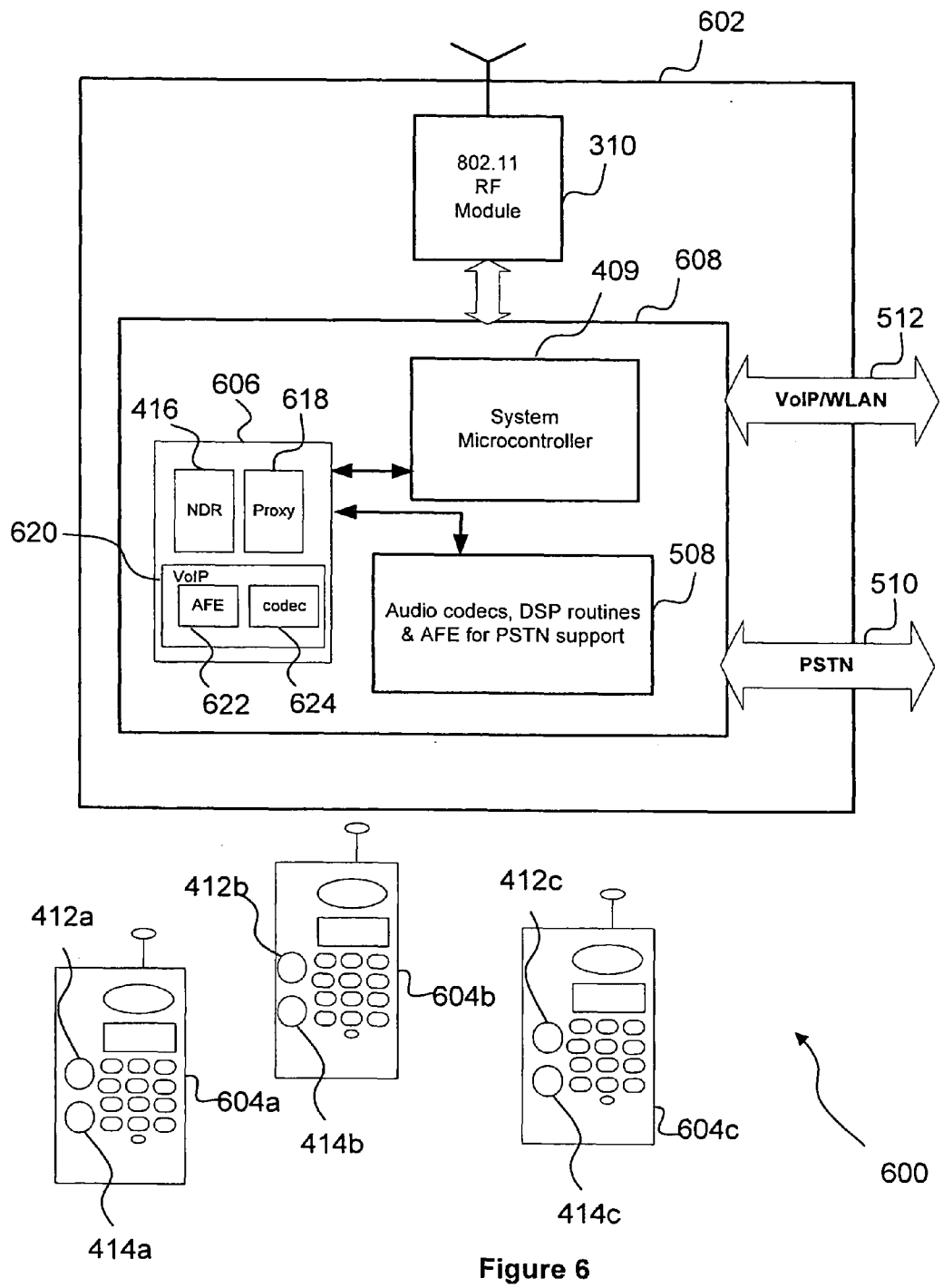
FIG. 6 is a schematic diagram of a hybrid cordless telephone system according to an embodiment of the present invention configured to operate with multiple wireless handsets.

FIG. 6 is a schematic diagram of another hybrid cordless telephone system that allows a user to send and receive telephone calls over a data network or the PSTN. A system 600 is configured to provide operation of a plurality of wireless handsets, e.g., handsets 604*a*, 604*b*, and 604*c*, with base unit 602. A system router 608 is coupled to the PSTN through a PSTN line 510 and to a data network through a data network line 512. PSTN module 508 and system microcontroller 409 are configured substantially the same as PSTN module 508 and system microcontroller 409 described above with respect to FIG. 5. A communications manager 606 is configured to terminate VoIP and PSTN calls at system router 608. In one embodiment of the present invention, communications manager 606 contains a proxy module 618 that acts as a SIP proxy within system router 608. Using SIP proxy 618, all outgoing and incoming VoIP calls are terminated at system router 608.

Communications manager 606 also contains a VoIP module 620. VoIP module 620 includes an analog interface 622 and a VoIP voice codec 624. Analog interface 622 and VoIP voice codec 624 operate in a similar manner to AFE 320 and audio codec 326, respectively, described above with respect to FIG. 3. By terminating VoIP calls at system router 608, system 600 can provide a link to multiple handsets 604*a-c*, any of which can place or receive a VoIP call. For example, when an incoming VoIP call terminates at system router 608, IP packets can be forwarded to any of wireless handsets 604*a-c* using communications manager 606. Unlike handsets 410 and 410*a*, wireless handsets 604*a-c* do not contain VoIP analog interface 312 or codecs 314, and are not individually addressable devices. Thus, incoming data network calls are terminated at an IP address corresponding to system router 608. Signaling between system router 608 and handsets 604*a-c* can be based on SIP, Media Gateway Control Protocol (MGCP), or a proprietary protocol.

When system router 608 receives an incoming call signal over PSTN line 510 or VoIP line 512, the call signal is broadcast by RF module 310 over a transmission range distance. Where wireless handsets 604*a-c* are 802.11 compliant, any or all of handsets 604*a-c* within the transmission range distance that is associated with system router 608, can receive and terminate the incoming call signal. Thus, in system 600, multiple wireless handset users can participate in an incoming call received from the PSTN through PSTN line 510 or from a data network through VoIP line 512.

In addition, any of wireless handsets 604*a-c* can be used to place a telephone call over a data network or the PSTN. Assuming only one VoIP service number is provided, each VoIP call would take place in serial fashion. As noted above with respect to FIG. 4*a*, however, simultaneous calls could be placed from two different handsets 604, where one call is placed over the PSTN and the other over the data network.

In one implementation, multiple wireless handsets 604 of system 600, e.g., wireless handsets 604*a* and 604*b*, can participate in a VoIP telephone call over the data network, while a separate handset 604*c* can participate in a telephone call over the PSTN.

Figure 7A:
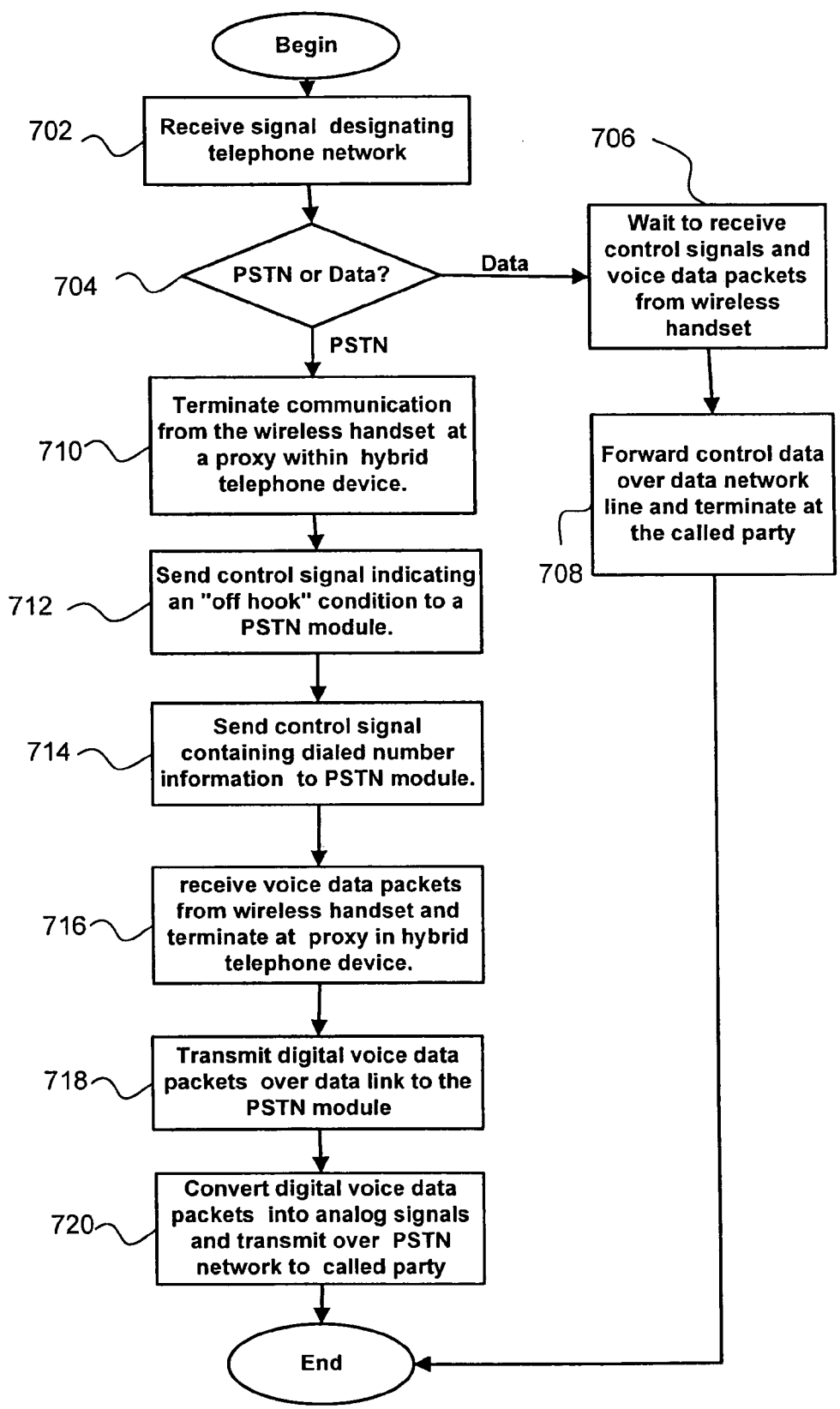
FIG. 7a is a flow chart for a method for placing a telephone call from a wireless device using a hybrid cordless telephone according to an implementation of the present invention.

FIG. 7*a* is a flow chart for a method for placing a telephone call from a wireless device using a hybrid cordless telephone device, according to an embodiment of the present invention. In step 702, a signal is received designating a telephone network to be used to place the telephone call.

In step 704, the hybrid cordless telephone device examines the received signal to determine whether the user desires to place the telephone call over the PSTN or a data network. If a data network, such as a VoIP network, is chosen, the process continues in step 706, where the hybrid telephone device waits to receive control signals having control data and voice data packets from the wireless handset. In step 708, the control data is forwarded over the data network line and the call is terminated at the called party. Subsequent voice data packets are received and routed by a system router as described above.

If, in step 704 the PSTN is designated, the process continues in step 710, where the communication from the wireless handset is terminated at a proxy within the hybrid telephone device. In step 712, a control signal indicating an "off hook" condition is sent over a data link to a PSTN module, such as PSTN module 408. The PSTN module receives the control information and sets an "off hook" state. In step 714, a control signal containing dialed number information is sent to the PSTN module. The PSTN module converts the dialed number information into DTMF tones which are transmitted over the PSTN to initiate the telephone call. In step 716, voice data packets are received over a wireless link from the wireless handset and terminated at the proxy in the hybrid telephone device router. In step 718, the digital voice data packets are transmitted over a data link to the PSTN module. In step 720, the PSTN module converts the digital voice data packets into analog signals, which are transmitted over the PSTN network to the called party.

Figure 7B:
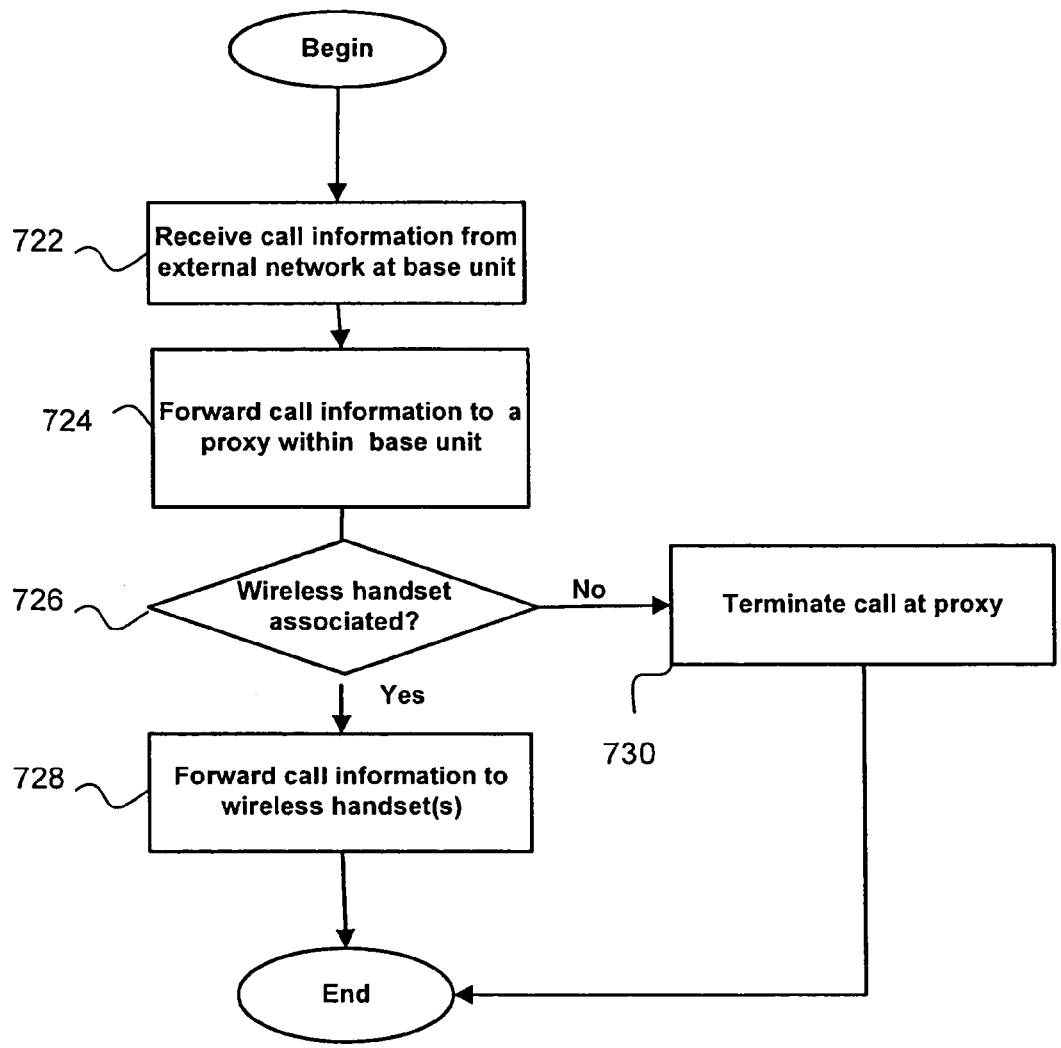
FIG. 7b is a flow chart of managing calls to a user of 802.11 communications devices that are local to an access point according to another implementation of the present invention.

FIG. 7b is a flow chart for a method for managing calls to a user of a communications device employing the 802.11 protocol that is also local to an access point of a base unit of a cordless telephone. In step 722, call information is received at the base unit, for example, at a system router within the base unit. The call information is received from an external network such as a PSTN or a VoIP network. Such call information can be, for example, a call signal or voice data received from a calling party.

In step 724 the received call information is forwarded to a proxy in the base unit. For example, the proxy can be associated with a telephone number that is dialed by an external calling party. The proxy can have its own unique IP address used for communication over the Internet or other data network.

In step 726, the base unit checks to see if there is a wireless 802.11 device associated with the router. If there are no associated wireless devices, the process continues in step 730 where the incoming call information is terminated within the proxy without forwarding call information from the base unit to any wireless devices.

If there are associated wireless devices, the process continues in step 728, where the base unit forwards the call information as data packets over an 802.11 link, so that any associated wireless 802.11 device can receive the call information. Accordingly, a user or users that may employ a plurality of wireless devices that can associate with the base unit, can receive an incoming call from a data network at any of the wireless devices.

In the above implementation, a hybrid wireless communications system is provided that allows a user to place (or receive) a call over either a data network, such as, for example, the Internet, or the PSTN. In one embodiment of the present invention, a system router and PSTN unit are coupled with a communications manager in a novel architecture, such that extensive redesign of system router components and PSTN components is not needed to provide a wireless user with data and PSTN network connectivity.

Figure 8:
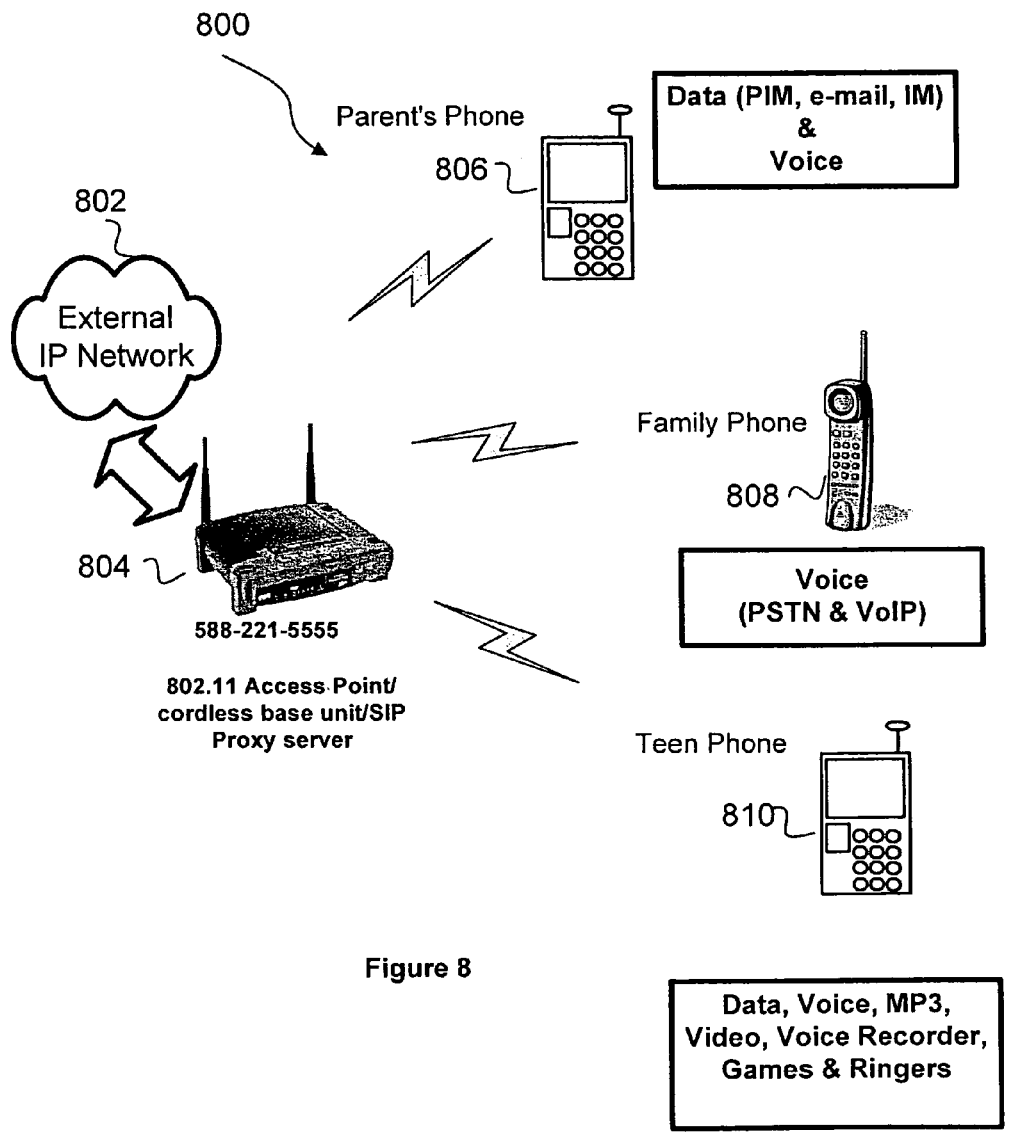
FIG. 8 is a schematic diagram for a hybrid cordless telephone system having multi handset capability in an 802.11 wireless system according to another embodiment of the present invention.

FIG. 8 is a schematic diagram of a system 800 having multi-handset capability in an 802.11 wireless system, according to another embodiment of the present invention. In this embodiment, a VoIP provider 802 communicates with a base unit 804 that contains a system router (not shown) using PCM/G.711 voice compression technology. Base unit 804 is configured with software for call management for VoIP calls including SIP proxy functions as described above. In one embodiment, base unit 804 may be additionally configured with a unit such as PSTN module 508 of FIG. 5 to support communications over the PSTN.

Handsets 806, 808, and 810 are not individually addressable from the outside world, such as from VoIP provider 802. When a call is received from VoIP provider 802, a system router of base unit 804 registers with service provider 802. The incoming call can then be forwarded to a handset that is associated with the wireless router of base unit 804, such as handsets 806, 808, or 810. For example, handsets 806, 808, and 810 can register with a wireless router of base unit 804 when the former are powered on, according to known methods for registering 802.11 handsets with an access point. In this case, the access point is the wireless router of base unit 804). In the example shown in FIG. 8, each handset is configured to support a different set of applications, such as MP3, voice, video, games, PSTN, and VoIP. Despite the different applications, handsets 806, 808, and 810 can be configured to have essentially the same communications functions.

When handset 806 is used to place an outside telephone call, it establishes communication with base unit 804 over a wireless link using SIP or other signaling protocol. Base unit 804 then initiates a telephone call to the outside world and connects the telephone call to handset 806. This action bridges the telephone call between an outside server of VoIP provider 802 and handset 806. In one embodiment of the present invention, two simultaneous calls can be placed from handsets 806 and 808 over a VoIP network (not shown) using service provider 802. In other embodiments, multiple simultaneous calls can be placed from multiple handsets (not shown). The number of simultaneous calls possible using this configuration of the present invention is limited only by the service offering by VoIP service provider 802.

In one embodiment of the present invention, during an incoming call, handsets 806 and 808, and any other handsets (not shown) associated with base unit 804 are configured to ring at once. When the incoming call is received at base unit 804, a proxy (not shown) in base unit 804 receives incoming data packets from VoIP provider 802 and passes the data packets to all the handsets associated with the system router of base unit 804. This operation differs from conventional communication using 802.11 wireless handset devices, where multiple individually addressable wireless devices are registered with a system router. In that case, phone messages or data packets coming from an external network are only passed to one device based upon the IP address of that device.

In one embodiment of the present invention, Multicast-Group/Broadcast messages in 802.11 protocol are used to send data packets simultaneously to a plurality of wireless handsets associated with a base unit. In Multicast-Group addressing, a group of logically related stations (such as all wireless handset within one household) can be addressed together. However, multicast messages are typically of lower priority and are not guaranteed to reach every wireless device.

Another embodiment of the present invention overcomes this issue. In this embodiment, each handset establishes a communication session for each party in a multi-party call being received from a common base unit, such as base unit 804. Audio is then mixed locally on each handset that is registered to receive the incoming data packets from the base unit.

In yet another embodiment of the present invention, a ring message from an outside data network is sent as a unicast message to all 802.11 wireless devices associated with a base unit. The ring message is sent sequentially so that the handsets do not ring with a delay with respect to each other, which could create confusion. Similarly, in one embodiment of the present invention, multiple handsets can simultaneously listen to an incoming call. In this case, a base unit sends data packets coming from a VoIP provider to all of the multiple handsets in a predetermined fashion, for example, sequentially to each of the handsets. In a particular embodiment of the present invention, all the wireless handsets can be configured to receive voice data coming from an outside party, while only one handset can transmit voice data to the outside party.

In another embodiment of the present invention, a multicast signal is sent to each handset for power conservation purposes. For example, a DTIM setting can be used to trigger a multicast transmission to all handsets in a power save mode of operation. One setting for DTIM is 700 ms. However, there are two problems with the multicast operation in this context. First, there is no acknowledgement to verify receipt of the multicast message. For this reason, cordless telephones generally send a multicast message a number of times, for example, 3 times. However, with 3 retries and a DTIM set to 700 ms, it will be almost 3 seconds before a multicast message with new information can be sent. This can become a problem for synchronizing ring ON and ring OFF to follow an incoming cadence from the PSTN.

To overcome this problem, in an embodiment of the present invention, Unicast messages are used for ringing, and multicast messages are used for virtually everything else. Multicast is used because it has some better performance in certain environments, for example, interference environments. Time diversity is achieved from the DTIM interval more so than Unicast retries since it is more immediate. However, as before, this benefit of multicast is lost if the interval of what is being sent is shorter than the DTIM interval.

Figure 9:
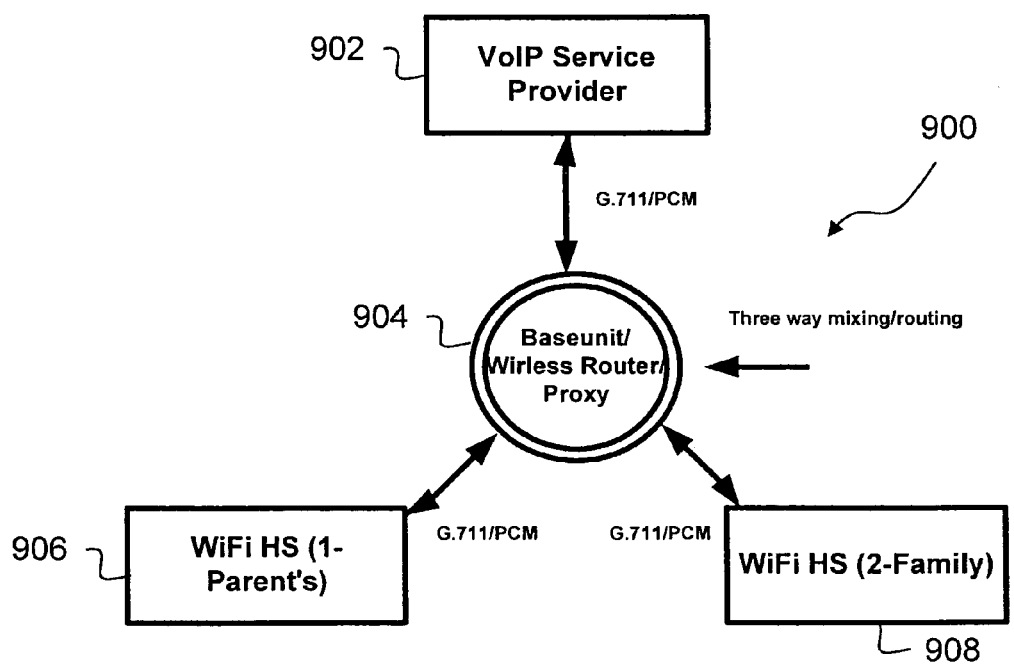
FIG. 9 is a schematic diagram for a cordless telephone system that provides for conferencing between a remote party and multiple WiFi handsets associated with a base unit connected over a data link to the remote party according to another embodiment of the present invention.

FIG. 9 is a schematic diagram of a system 900 according to an embodiment of the present invention that supports conferencing where a remote party can listen to each and every WiFi handset associated with base unit 904 simultaneously. Thus, multiple handset users 906 and 908 can hear and speak to each other and a remote party (not shown) connected to VoIP provider 902. As shown in FIG. 9, a base unit 904 supports some audio processing functionality in addition to call management. As an example, handsets 906 and 908 can be conferenced with an outside party in a three way call. Audio mixing functions during a phone call are performed by base unit 904. In one embodiment of the present invention, voice compression is provided by a linear codec according to the PCM/G.711 standard. Base unit 904 sends a data packet to each handset as it comes from service provider 902. Similarly, in the outgoing direction, data signals can be simply mixed at base unit 904 in the PCM domain before sending out to VoIP service provider 902. Accordingly, no audio transcoders required to perform this conferencing function. In other embodiments, more than 2 handsets can be employed in a conference mode using audio mixing at base unit 904.

In addition to audio routing during conference call, in another embodiment of the present invention, base unit 904 is configured to allow additional handsets to join a call that is initiated from a single handset or received by a single handset. To accomplish this, intelligence is built into base unit 904 to route the same data packet to multiple handsets when a conference mode is initiated. For example, voice packets from handset 906 are forwarded to base unit 904 and mixed with voice packets received from a remote party. The mixed packets of voice data from handset 906 and from the remote party (not shown) are then routed to handset 908.

When routing data packets from a remote party to various handsets using 802.11 protocol, a delay time might vary between handsets. If this delay is not the same for all handsets, the system might not behave as intended/desired. Different users might hear voice data received from the remote party at different times. Accordingly, in one embodiment of the present invention, intelligence in base unit 904 is used to block a certain time of an 802.11 link for voice applications to help synchronize transmission of data packets to multiple handsets. In addition, the 802.11 e protocol can be used to allow various devices to reserve operating bandwidth.

In another embodiment of the present invention, a VoIP service provider can employ codecs other than PCM/G.711 codecs. Packets coming from a VoIP service provider can be routed to individual 802.11 wireless handsets directly without change (provided the handsets support the functionality). However, outgoing packets are converted to PCM/G.711 at a base unit when a handset sends data packets in another format such as PCM/G.726, PCM/G.729, etc.

Figure 10:
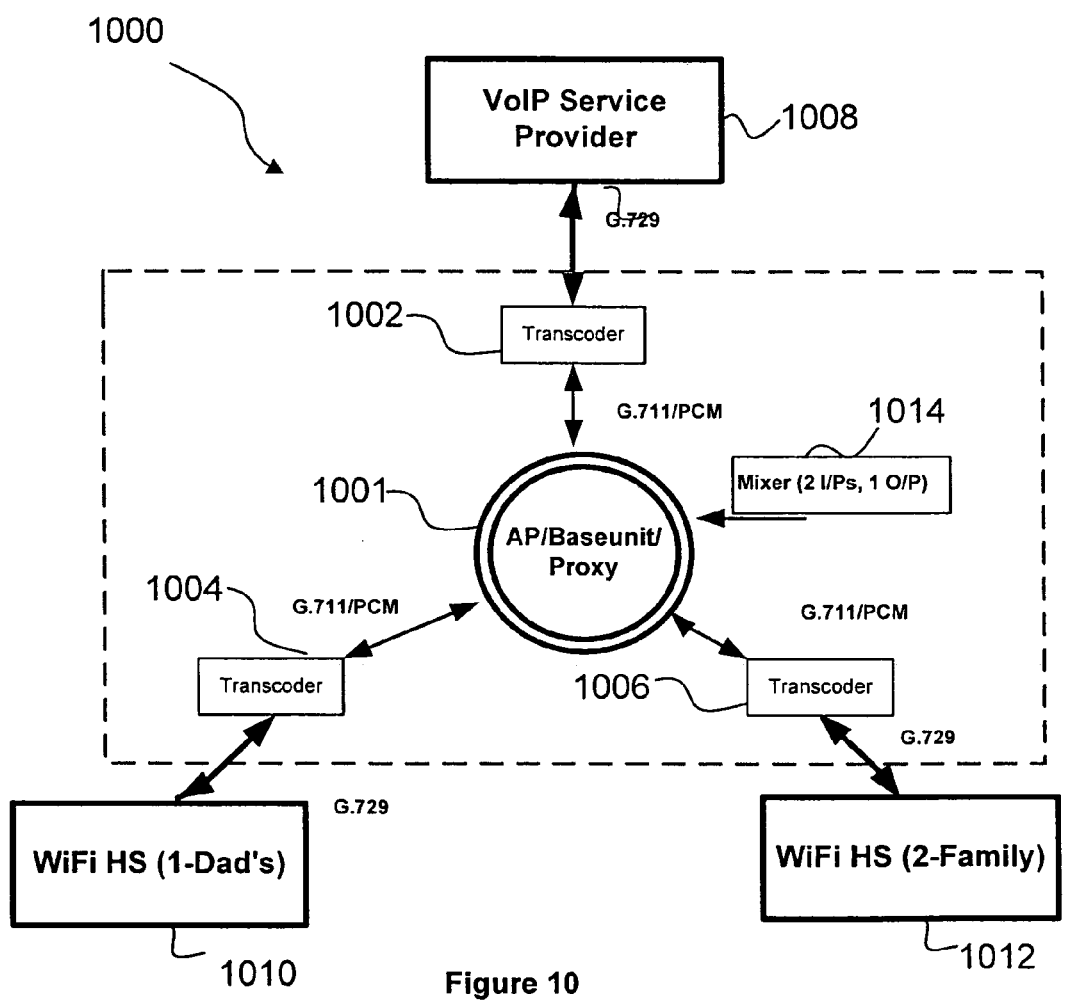
FIG. 10 is a schematic diagram for a cordless telephone system that provides an audio packet management system arranged according to another embodiment of the present invention.

FIG. 10 is a schematic diagram of an audio packet management system 1000 according to another embodiment of the present invention. System 1000 includes a base unit 1001 and transcoders 1002, 1004, and 1006 linked to a VoIP provider 1008, a handset 1010 and a handset 1012, respectively.

Base unit 1002 includes an audio routing management mixer 1014 to make sure the samples are mixed together properly and sent as desired. As an example, an audio sample belonging to time interval T1 (10, 20 or 30 ms) received from a party connected at a remote location over VoIP provider to base unit 1002, is mixed with an audio sample belonging to time interval T1 received from handset 1010, and is sent to handset 1012 as a single data packet. In the example shown, VoIP service provider 1008 uses a PCM/G.729 codec for communication. In this case, packets coming from service provider 1008 can be routed to the individual handsets 1010 and 1012 directly without change. However, outgoing packets will have to be converted to the PCM/G.711 at base unit 1002 if handsets 1010 and 1012 employ another format such as PCM/G.726, PCM/G.729, and convert these back to the codec used by service provider.

In summary, one embodiment of the present invention is a hybrid cordless telephone system for allowing a user to place a telephone call over the PSTN or a data network, such as the Internet. The hybrid cordless telephone system includes a wireless handset configured to communicate with a base unit over a wireless link; a system router for routing communications from the wireless handset to a data network or to a PSTN network; a base unit processor coupled to the system router over an internal digital link that performs a set of PSTN processing functions, thereby relieving the system router from having to perform these functions; and a communications manager for managing incoming and outgoing calls in accordance with a type of network used for the telephone call.

In a preferred embodiment of the present invention, the handset of the hybrid telephone system communicates with the base unit wirelessly using the 802.11 standard. Preferably, the hybrid telephone system handset includes VoIP functionality. Preferably the base unit processor comprises an ASIC chip configured to support WDCT functions. Preferably, the WDCT functions include: data compression and decompression, DSP routines for PSTN support and DTMF generation and detection. Preferably, the internal digital link contains a digital audio link for communicating audio information to the processor router and a data link for communicating digital control data to the system router. In one embodiment of the present invention, the wireless handset includes a PSTN button for selecting a PSTN network to handle the telephone call and a VoIP button for selecting a VoIP or other IP network to handle the telephone call.

In one embodiment of the present invention, the hybrid cordless telephone system includes a handset communications routine that preferably contains a header stripper routine to strip 802.11 header and MAC address information from an outgoing telephone call directed to the PSTN. The base communications module is configured to send to the base unit processor an offhook signal and a DTMF string that transmits called number information initiated from the wireless handset to the base unit. In another embodiment of the present invention, the hybrid cordless telephone system includes a SIP proxy configured to receive voice data packets to be routed to the PSTN network.

In another embodiment of the present invention, the hybrid telephone system includes at least one additional wireless handset, wherein the system is configured to concurrently place a PSTN telephone call from a first wireless handset and a VoIP call from a second wireless handset.

In one embodiment of the present invention, a hybrid wireless telephone system includes: a plurality of wireless handsets configured to communicate with a base station of the telephone system using an 802.11 standard; a system router included in the base station and coupled to a data network and to the PSTN; an SIP proxy that terminates data network and PSTN telephone calls at the system router; and a PSTN unit containing a set of PSTN processing functions, wherein each of the plurality of handsets can receive and place a telephone call over the data network or the PSTN. Preferably, the hybrid wireless telephone system further includes: a VoIP audio codec for compressing and decompressing VoIP data packets and an analog interface for transforming a digital data packet into an analog signal. In one embodiment of the present invention, the PSTN unit includes: an analog front end for receiving and transmitting analog voice signals and transforming the signals into digital form; a set of audio codecs for compressing and decompressing voice data packets, DSP routines for PSTN support, and DTMF generation and detection devices for sending and receiving DTMF signals over the PSTN network. Preferably, signaling between the system router and the plurality of wireless handsets is based on either SIP, MGCP, or a proprietary communications protocol.

In a further embodiment of the present invention, a method of placing a telephone call from a wireless handset of a hybrid cordless telephone system, includes: receiving a signal from the wireless handset designating a telephone network to carry the telephone call; if the PSTN is designated, terminating the telephone call at a proxy within a hybrid cordless telephone system; terminating voice data packets sent from the wireless handset at the proxy; transmitting digital voice data packets from the proxy to a PSTN module; converting the digital voice data packets into analog signals; and transmitting the analog signals over the PSTN network to the called party. Preferably, the wireless handset communicates with the hybrid telephone device using an 802.11 protocol.

In another embodiment of the present invention, the method further includes the steps of: sending a control signal indicating an "off hook" condition to a PSTN module; sending a control signal containing dialed number information to the PSTN module; and terminating the call at a called party using the dialed number information.

In another embodiment of the present invention, the method further includes the steps of: forwarding a control signal indicating a called party number over the data network line if a data network is chosen to transmit the call; terminating the call at the called party; and routing voice data packets to the called party over the data network using VoIP protocol.

In a further embodiment of the present invention, a method for managing calls to a user of 802.11 communications devices local to an access point, includes: receiving call information over an external network, e.g., the Internet, at a base unit containing the access point, the base unit being linked to the PSTN and data network; terminating the call information at a proxy within the base unit; and forwarding the call information as data packets to the 802.11 communications devices over a wireless communications link, wherein each of the 802.11 communications devices is configured to receive the data packets.

In another embodiment of the present invention, a hybrid cordless telephone system includes: a base unit equipped with a wireless router configured to route communications to and from a data network; a plurality of wireless handsets, each handset configured to communicate with the wireless router using an 802.11 protocol; and a proxy within the base unit configured to terminate incoming communications from the data network and forward them as data packets to the plurality of wireless handsets, wherein an incoming call received at the base unit from the data network can be received by any of the wireless handsets. The hybrid cordless telephone system can further include a PSTN unit containing a set of PSTN processing functions, wherein each of the plurality of handsets can receive and place a telephone call over the data network or the PSTN. Data packets can be sent to the wireless handsets using Multicast-Group/Broadcast messages in the 802.11 protocol. Further, each handset can establish a session to receive the incoming data packets. For example, in one embodiment of the present invention, a ring message for an incoming call from the data network is sent to each handset sequentially as a unicast message. Moreover, a plurality of wireless handsets can place simultaneous calls over the data network.

In a further embodiment of the present invention, the hybrid cordless telephone system further includes: a codec for compressing and decompressing voice data samples transmitted to and from the wireless router; and an audio mixer that mixes voice data received at the base unit in the pulse code modulation domain before the mixed voice data is transmitted to the data network, wherein voice data sent from the plurality of wireless handsets can be received at the same time by a party connected to the data network.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. For example, although disclosed embodiments focused on the use of wireless devices employing an 802.11 communications protocol, other protocols that can be implemented in wireless telephone terminal devices including PDA's, such as Bluetooth are within the scope of this invention. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A hybrid cordless telephone system, comprising:
a base unit of the hybrid cordless telephone system comprising a chip configured with WDCT (wireless digital cordless telecommunications) processing functions; and
a plurality of handsets, each handset capable of initiating a telephone call to a called party via the base unit, wherein:
each handset comprises an antenna to wirelessly communicate with an RF module of the base unit using the WDCT processing functions, and a VoIP engine configured to provide VoIP engine functionality to its respective handset;
the base unit comprises a system router coupled to the RF module of the base unit to receive one or more data packets corresponding to a telephone call initiated by one of the handsets;
the system router is configured to forward the received data packets to either a public switched telephone network (PSTN) or to a data network according to information provided by the handset that initiated the telephone call; and the base unit further comprises a base unit processor configured to receive the data packets destined for the PSTN, and to process received data packets destined for the PSTN to produce analog voice signals suitable for transmission over the PSTN to the called party and to process data packets destined for the data network for transmission over the data network.

2. The hybrid cordless telephone system recited in claim 1, wherein the base unit processor further comprises an audio codec for decompressing compressed digital packets prior to conversion to analog signals for transmission over the PSTN, and to compress digitized signals corresponding to analog signals received from the PSTN.

3. The hybrid cordless telephone system recited in claim 1, wherein a first handset carries on a first telephone call over the PSTN and a second handset carries on a second telephone call over the data network, and wherein at least a portion of the first and second telephone calls are carried on simultaneously.

4. The hybrid cordless telephone system recited in claim 1, wherein the data network is the Internet.

5. The hybrid cordless telephone system recited in claim 1, wherein the plurality of handsets communicate with the RF module according to an 802.11 protocol, and wherein the system router is coupled to the base unit controller through a data line and a separate digital audio line.

6. The hybrid cordless telephone system recited in claim 1, wherein the plurality of handsets include an audio codec for compressing digital data packets sent to the RF module, and decompressing digital data packets received from the RF module.

7. The hybrid cordless telephone system recited in claim 1, wherein each handset comprises an analog interface for digitizing a user's voice into first digitized voice data to be sent to the base unit, and for converting second digitized voice data received from the base unit for playback to the user.

8. The hybrid cordless telephone system recited in claim 1, wherein the analog interface performs CID FSK detection and call progress tone detection.

9. The hybrid cordless telephone system recited in claim 1, wherein a handset transmits called party telephone number information to the base unit to be used to complete the telephone call.

10. The hybrid cordless telephone system recited in claim 9, wherein the base unit processor include a DTMF module that converts the called party telephone number information to DTMF tones when the telephone call is destined for the PSTN.

11. A hybrid cordless telephone system, comprising:
a base unit of the hybrid cordless telephone system comprising a chip configured with WDCT (wireless digital cordless telecommunications) processing functions;
a plurality of handsets, each handset capable of initiating a telephone call to a called party via the base unit, wherein each handset is configured to wirelessly communicate with the base unit;
said handset comprising a VoIP engine configured to provide said handset with VoIP engine functionality;
the base unit comprises a system router configured to receive one or more data packets corresponding to a telephone call initiated by one of the handsets, and forward the received data packets to a public switched telephone network (PSTN) or to a data network using information provided by the handset that initiated the telephone call; and the base unit further comprises a base unit processor configured to receive the data packets destined for the PSTN, and to process the received data packets destined for the PSTN to produce analog voice signals suitable for transmission over the PSTN to the called party and to process data packets destined for the data network for transmission over the data network, wherein each handsets further comprises a VoIP button, a PSTN button, and a user interface configured to provide a dialed number for the called party, and wherein the system router further comprises a base communications module configured to select a network from the PSTN or the data network based upon which of the VoIP or PSTN buttons of the handset that initiated the telephone call have been pressed, and initiate the telephone call over the selected network in response to receiving the dialed number for the called party.

12. The hybrid cordless telephone system recited in claim 11, wherein the network detection routine receives a signal from the handset that is used to determine whether to route the telephone call to the PSTN or to the data network.

13. The hybrid cordless telephone system recited in claim 11, further comprising a base communications module, the base communications module comprising a proxy that allows the system router to terminate a telephone call destined for the PSTN.

14. The hybrid cordless telephone system recited in claim 11, wherein the system router includes apparatus for PSTN and data network support so that the system can be directly coupled to the PSTN and to the data network.

15. The hybrid cordless telephone system recited in claim 11, further comprising a router communication interface to modify data so that the data can be sent to the system router rather than directly to a handset over an RF link.

16. A method for managing telephone calls in a hybrid cordless telephone system comprising a plurality of handsets capable of initiating a telephone call via a base unit, the method comprising:
initiating a telephone call using a handset selected from the plurality of handsets, of a hybrid cordless telephone system, said handset comprising a VoIP engine configured to provide said handset with VoIP engine functionality;
receiving with the base unit comprising a chip configured with WDCT (wireless digital cordless telecommunications) processing functions, one or more packets corresponding to the telephone call over a wireless link between the base unit and the selected handset;
determining whether to route the call to a public switched telephone network (PSTN) or to a data network based upon information received from the selected handset;
in response to determining, based on the information received from the selected handset, that the call is routed to the data network, routing the data packets destined for the data network directly to the data network; and
in response to determining, based on the information received from the selected handset, that the call is routed to the PSTN, converting the data packets destined for the PSTN to analog PSTN voice signals, and routing the analog PSTN voice signals to the PSTN.

17. The method recited in claim 16, wherein the handset places a standard VoIP call and wherein the proxy module is configured as a session initiation protocol proxy.

18. The method recited in claim 17, further comprising decompressing the data packets prior to converting them to an analog signal.

19. The method recited in claim 16, further comprising compressing digital packets corresponding to an analog signal received from the PSTN.

20. The method recited in claim 16, further comprising:
carrying on a first telephone call over the PSTN; and
carrying on a second telephone call over the data network, wherein at least a portion of the first and second telephone calls are carried on simultaneously.

21. The method recited in claim 16, wherein the data network is the Internet.

22. The method recited in claim 16, further comprising communicating over the wireless link according to an 802.11 protocol.

23. The method recited in claim 22 further comprising transmitting an indication of whether to route the telephone call to the PSTN or to the data network over the wireless link in an 802.11 extension.

24. The method recited in claim 16, further comprising compressing the data packets prior to sending them over the wireless link.

25. The method recited in claim 16, further comprising decompressing data packets received from the wireless link.

26. The method recited in claim 16, further comprising digitizing the user's voice to generate the data packets sent over the wireless link.

27. The method recited in claim 16, further comprising converting data packets received from the wireless link to an analog signal for playback to a user.

28. The method recited in claim 16, further comprising transmitting called party number information over the wireless link.

29. The method recited in claim 28, further comprising converting the called party number information to DTMF tones when the telephone call is destined for the PSTN.

30. The method recited in claim 16, further comprising transmitting an indication of whether to route the telephone call to the PSTN or to the data network over the wireless link according to which of a PSTN button or a VoIP button on a handset has been pressed.

31. The method recited in claim 16, further comprising terminating the telephone call at a proxy when the telephone call is destined for the PSTN.

32. The method recited in claim 31 further comprising sending a control signal indicating an "off hook" condition to a PSTN module when the call is destined for the PSTN.

33. The method recited in claim 16, further comprising:
when the telephone call is destined for the data network:
forwarding control signals received over the wireless link to the called party, and
terminating the telephone call at the called party when the telephone call is destined for the data network.

34. The method recited in claim 33, further comprising terminating the telephone call at a proxy when the telephone call is destined for the data network.

35. The method recited in claim 16, further comprising registering the handsets with the base unit when they are powered on.

* * * * *